United States Patent Office 2,894,847
Patented July 14, 1959

2,894,847
WATER-RESISTANT ADHESIVE COMPOSITIONS

Roy E. Wright, Oakland, Calif., assignor to Philadelphia Quartz Company of California, Berkeley, Calif., a corporation of California No Drawing. Application April 22, 1955
Serial No. 503,319

4 Claims. (Cl. 106—79)

This invention relates to water-resistant adhesives and manufacture of laminated products therewith; and it comprises a silicate-protein adhesive which is capable of setting in the cold to produce bonds having wet strength; said adhesive containing from about 5 to 25% by weight of a water-extracted soya protein fraction which is free from products of degradation and hydrolysis, such as would be produced by heating to temperatures above about 95° C. and/or by contact with aqueous liquors having a pH above about 8, and free from components soluble in water at the isoelectric point of the protein, said protein fraction being dispersed in from about .75 to 5% of an aqueous solution of a sodium silicate having a weight percent ratio of $Na_2O$ to $SiO_2$ within the range of from about 1:1.5 to 1:4, sufficient water being present to produce an operable viscosity at operating temperatures; said adhesive being free from extraneous alkali in addition to that present in the silicate solution, having a working life of from about one day to several weeks and having the characteristic property of forming a bond under cold setting conditions which shows wet strength, and a bond which, when set either by heating or under cold setting conditions, produces extensive tear both when wet and when dry. The invention also includes a laminating process in which the described adhesive is applied to a ply to be combined and the coated ply is then combined with another ply at a temperature which may be a temperature not substantially exceeding room temperatures, followed by curing the resulting laminated product at substantially room temperatures; all as more fully hereinafter set forth and as claimed.

There has long been an important demand for low cost adhesives capable of producing water-resistant bonds in the production of laminated products such as corrugated and solid paper boards, plywood, paper tubes, paper-to-wood laminates, metal foil-to-paper laminates etc. The proportion of water-resistant manufactured products of this type has gradually increased over the past few years until at present approximately 10% of such products are water resistant. At the same time the water-resistant requirements of such products has been increasing. A common specification for water-resistant paper board now requires that a test piece of combined board having dimensions of 10 x 6 inches and a thickness of 0.1 inch absorb no more than 50% by weight of water upon immersion at a temperature of 80° F. for a period of 2 hours, the Mullen test after immersion being not less than 200 when measured 2 inches from the edge. This specification further requires that any separation of the plies caused by an immersion of one hour must not exceed 2 inches at any point.

With some laminated products it makes little difference whether or not the adhesive to be used is capable of setting in the cold to produce bonds having wet strength since these products are conventionally made by hot-setting method. But in the case of other products, such as ply-wood and wound paper tubes, it is difficult to apply heat to the adhesive bonds and hence cold-setting adhesives are in demand for the manufacture of this type of product. The present adhesive is particularly adapted for use in the manufacture of laminated products of this type, i.e. products whose adhesive bonds are difficult to heat sufficiently to produce hot-setting.

While synthetic resin adhesives produce satisfactory water-resistant laminated articles these are to expensive to be used in making cartons for bottled drinks, wet vegetables, citrus fruits etc. The popular starch-urea-formaldehyde adhesives can be used on heavy stock at slow machine speeds only of from about 100 to 150 feet per minute. Moreover these adhesives develop a noxious odor which is offensive to the operators and the adhesives are difficult to control on the machine. They are acid in reaction and corrosive to metal parts and they require difficult and expensive cleaning operations when a switch is made to ordinary adhesives. These adhesives moreover require heating to produce wet-strength bonds.

In U.S. Patent No. 2,681,290, water-resistant silicate adhesives are described which are said to contain up to 10% of vegetable protein. The specific examples in this patent show adhesive compositions produced by dispersing in silicate solutions oil seed flours, such as soya bean flour, the oil seed flours supplying the protein content to the adhesives. These adhesives are said to require from about 50 to 200% more total heat to set them than in the case of straight silicate adhesives. In other words these adhesives are obviously of the heat-setting type.

I have discovered that, for some unobvious reason, the adhesives of Patent No. 2,681,290 are not capable of setting in the cold to produce bonds with wet strength, whereas in contrast adhesives of the present invention having substantially the same protein content can be set in the cold and, after a short curing operation, produce bonds having substantial wet strength. Straight silicate adhesives and straight starch adhesives are likewise incapable of producing cold-set bonds having wet strength.

This invention involves the use of a particular type of protein fraction having certain properties. This particular protein fraction can be produced by using any of a number of processes. Since the novelty of the present invention resides in the discovery that novel and superior adhesives can be produced by using any protein fraction having certain designated properties, the precise method of manufacturing the protein fraction is not important so long as the protein fraction has the designated properties. This invention therefore contemplates the use of such protein fractions, whether manufactured by past, present or future processes.

One method of producing a protein fraction which is suitable for this invention involves the following steps:

(1) Soybean flour is treated with an aqueous solution to extract the protein content of the flour, (2) The aqueous solution should be a "soft" water having a pH close to the neutral and preferably between 6.5 and 8.

(3) The aqueous extract solution obtained from step 1 is adjusted to a pH which corresponds so the isoelectric point of the extracted protein. (The isoelectric point is the point at which a substance or system is electrically neutral, usually expressed in pH value. The isoelectric points of the proteins contemplated for this invention can be reached by adjusting the pH within the range from about 4.1 to 5.5.

(4) When the above mentioned aqueous extract solution is adjusted to a pH value which corresponds to the isoelectric point of the extracted protein, all of the extracted components of the soya flour which are soluble in the aqueous extract solution at this pH value remain in the aqueous extract solution. Such soluble components would for example include gum, the so-called "colloidal complexes" which are composed of carbohydrates, such as polysaccharides, and hemicellulose, soluble cellulose derivatives, etc. Components having wetting and/or dispersing properties would doubtless be included in the separated soluble material.

(5) Also, when the above mentioned aqueous extract solution is adjusted to a pH value which corresponds to the isoelectric point of the extracted protein, all of the extracted components of the soya flour which are insoluble in the aqueous extract solution at this pH value will "settle out" or "precipitate out" of the aqueous extract solution. This precipitated fraction is the "protein fraction" which is particularly useful in accordance with this invention.

(6) The soluble components mentioned in (4) and the insoluble components mentioned in (5) may be easily separated from one another by removing the supernatant liquor from the precipitated material.

If, during the above described process for isolating the specified protein fraction, the protein is either heated to a temperature exceeding about 95° C. or subjected to aqueous solutions having a pH exceeding about 8, the protein will be degenerated, denatured and/or hydrolyzed to such an extent that adhesives made therefrom are no longer capable of setting in the cold to produce wet strength bonds. Accordingly, such conditions should be avoided.

It is obvious, of course, that when an oil seed flour is employed as the source of protein in silicate-protein adhesives, as in No. 2,681,290, the protein present has not been denatured or hydrolyzed prior to dispersion in the silicate solution. Yet, as stated previously, adhesives produced in this manner are incapable of setting in the cold to produce bonds having wet strength. The protein fraction used in the present adhesives presumably has neither been denatured nor hydrolyzed, yet it has quite different properties. A possible explanation for this difference in behavior is that during the procedure in which my protein fraction is isolated, certain components having detrimental properties in the raw soya flour are eliminated. These components probably comprise wetting or dispersing agents. This is indicated by the fact that soya flour can be dispersed readily in aqueous solutions which are neutral or even slightly acid in solution, whereas my protein fraction cannot be dispersed in aqueous solutions effectively in the absence of at least a small amount of alkali.

Several isolated vegetable protein products are now available commercially. The first of these to appear could be dispersed in water without the aid of an alkali and was isolated from soya bean flours by procedures in which the vegetable protein was denatured or hydrolyzed to such an extent that it was no longer capable of producing satisfactory silicate-protein adhesives capable of setting in the cold with the production of wet-strength bonds. Recently at least two vegetable protein products have appeared on the market which have been isolated by extraction of a soya flour close to the neutral point followed by precipitation at the isoelectric point and separation of the protein. These particular protein fractions can be used in making the present adhesives.

It is possible to distinguish between these two types of vegetable protein by several rather simple tests. First, a properly separated protein will form a translucent hydrate at the isoelectric pH while denatured proteins will form a gel. Second, aqueous dispersions of denatured vegetable proteins display viscosities which decrease with increase of pH while undenatured vegetable proteins produce aqueous dispersions whose viscosities increase with increase in pH, the viscosities either passing through a maximum within the pH range of from about 10 to 13 or, in the case of the more concentrated dispersions, rising within this range until a gel is formed. Third, silicate-protein adhesives made with denatured proteins produce viscograph curves in which the viscosity either decreases gradually as the temperature is raised throughout the range of from 50° to 90° C. or whose viscosities rapidly fall to a minimum value then increase slightly (between about 60°–70° C.) to a low maximum, which lies only about 1 poise above the minimum, and then fall gradually again as the temperature continues to increase. In contrast, adhesives of similar composition but containing our undenatured and unhydrolyzed protein fraction in lieu of the denatured protein, produce viscograph curves whose viscosities fall gradually to reach minimum values within a temperature range of from about 40° to 55° C. and which then increase with extreme rapidity until gel formation takes place as the temperatures are increased through the range of from about 55° to 70° C. Fourth, my undenatured proteins will dissolve in a dilute caustic soda solution and if the temperature of the solution is raised gradually a gel will be formed at a relatively low temperature of about 100° F., will then become slightly fluid on raising the temperature to about 170° F. but will re-gel if cooled back to room temperature. Denatured proteins in contrast will either (1) not dissolve in the caustic alkali or (2) will remain fluid through the temperature range after once dissolving.

This fourth test is conducted by first mixing 100 parts of the protein to be tested with 450 parts of water. After moderate agitation, a caustic mixture made up of 5 parts caustic soda in 50 parts of water is added to the dispersion. Stirring is continued while the temperature is raised to 170° F. This test was conducted on 6 different commerciallly available protein products and on a sample of soy flour with the following results:

Operable protein:
  Beta Protein—Dissolved and then gelled _____ Dark green.
  Buckeye Protein—dissolved and then gelled _____ Dark green.
Inoperable protein:
  Soy flour—remained fluid _____ Orange.
  Alpha protein—dissolved and remained fluid _____ Amber
  Drackett 112A—remained fluid _____ Amber.
  Drackett D410—remained fluid _____ Amber.
  Drackett 220—did not dissolve _____ Yellow.

It is evident from the results given in the above table that the Beta protein and the Buckeye protein were the only two that passed this qualifying test. These are the only two protein products now available commercially which will produce cold-set bonds having wet strength when incorporated in silicate solutions to produce silicate-protein adhesives. It will be noted that even the soy flour failed in the above test and, as mentioned previously, silicate-soya adhesives when set in the cold produce bonds having no wet strength. I have found that the dark green color produced upon dissolving operative proteins in dilute caustic soda is a characteristic property of these proteins and provides a very convenient qualifying test for plant use, for example.

The Beta protein and Alpha protein are sold under these names by The Glidden Company and the samples tested were obtained from that company. The Buckeye protein is sold under that name by Buckeye Cotton Oil Co. and the sample tested was obtained from that company. It is said to have a molecular weight of over one million. The soy flour tested was one designated as IR 300 and purchased from the Staley Company. The Drackett proteins are sold under the designations given by Drackett Products Company. Drackett 112 is said to have a small molecular size, while 220 is a modified protein but with a high molecular weight, while D410 is said to be intermediate.

It should be noted, of course, that the protein in soya beans is very sensitive to modification by either heating or chemical treatment. It cannot be recovered from the soya bean without some modification. The protein fraction which is used in the present invention constitutes only about 80% of that present in soya flour, as determined by the nitrogen content (N x 6.25) of the two materials, and this separated fraction contains from about 90 to 102% protein on the same (dry) basis. It may contain up to about 62.5% nitrogen.

I believe that I am the first to have employed an undenatured and unhydrolyzed isolated soya protein in a silicate adhesive and to have discovered that this particular combination is capable of producing a new result, namely a cold-set bond having wet strength. This cold set bond, incidentally, is believed to be of quite a different type than that produced on heating silicate-protein adhesives. Aqueous solutions of operative proteins exhibit viscosities which increase with extreme rapidity both with increase of concentration and increase of pH. Gels are formed in both cases. This leads me to believe that when my silicate-protein adhesives are set in the cold the initial bond or "grab" produced is due to the formation of an alkaline gel, formed by dehydration of the adhesive as the water in the adhesive soaks into the base to which it is applied. In contrast, when such adhesives are heated, setting is due to glutinization of the protein. Much stronger bonds are produced on heating, as would be expected, but several advantages are obtained by the use of adhesives which are capable of setting in the cold to produce bonds having wet strength.

As mentioned previously, in the case of several types of laminated products it is difficult to apply sufficient heat to the adhesive bonds to produce setting thereof. In such cases cold setting adhesives are essential and, if water-resistance is required, it is also essential that the cold-set bonds exhibit strength when wet. Even when heat is applied in laminating operations it frequently happens that imperfect bonds are produced over short periods of operation and when adhesives capable of setting in the cold are employed these imperfect bonds are perfected in the stack, i.e. after the laminated board is stored. This action is, of course, of considerable importance. It is also true that when cold-setting adhesives are employed it is possible to operate laminating operations at higher speeds and/or at lower temperatures, relying upon the cold-setting property of the adhesive to produce the final bonding action in the stack. It requires less heat to produce a bond of a given strength or with the same amount of heat a higher laminating speed can be used. At the higher laminating speeds it is believed that a combined cold-set-hot-set bond is produced. It is not possible to convert the cold-set bond into a hot-set bond by heating it after setting (curing) has taken place. Curing of a cold-set bond usually requires at least 24 hours and is completed when the bond is thoroughly dry. After this point the strength of the cold-set bond, inherently low, cannot be increased by any degree of heating.

With respect to speed of laminating I have discovered surprisingly that with my new adhesives higher bond strengths are obtained when higher laminating speeds are employed. This will be demonstrated in Example 1 below. The cause for this phenomenon is not known but it may have something to do with alignment of linear protein molecules by additional shear produced at the higher operating speeds. It is equally possible that the increased strength of high-speed bonds is due to the fact that the combined cold-set-hot-set bond produced during high speed operations has a greater strength than the hot set bond produced at lower speeds. This effect is not produced by silicate adhesives made with either denatured proteins or with soya flour. In other words it is an effect characteristic of the silicate-protein adhesives of the present invention.

Another important advantage gained by the use of undenatured and unhoydrolyzed soya protein is that my adhesives produce bonds exhibiting a greater fiber tear. Measurement of fiber tear is a rough check upon the strength of bond which is used by all plant operators. It consists merely in pulling two plies apart at the glue line and noting whether the plies separate cleanly or whether the bond is stronger than the plies in which case the surface layer of at least part of one ply is torn off and remains attached to the other ply by the adhesive bond. The proportional area over which the adhesive bond produces fiber tear in the adjacent ply is taken as a measure of the bond strength. Since plant operators lay great stress on this particular test my adhesive gains more ready acceptance by these operators than adhesives made with denatured soya protein or soya flour.

Other advantages possessed by my adhesive are that it is highly flexible, since it can be set at ambient temperatures with a finite bond strength which becomes water-resistant on ageing, but when heat is applied board can be produced at normal operating speeds of from about 300 to 450 f.p.m. The fact that the bond will set in the cold makes control of the heat in the substrate and in the heating plates less critical.

A cold-set bond does not over-dry and produce dusting in later handling and it sets with the water content in equilibrium so that no warping is produced. In addition the adhesive can be used over a period of about 5 days without substantial deterioration and the development of noxious odors provided that temperatures of about 20° C. are not substantially exceeded while at 32° C. some odor may develop in about 3 days. Since the solution is alkaline there is no difficulty with corrosion and the plant operators can quickly switch from a water-resistant adhesive to a normal adhesive without cleaning their pans and other time-wasting operations.

Satisfactory adhesives can be made in accordance with the present invention with the undenatured and unhydrolyzed isolated protein fraction varying from about 5 to 25% by weight based on the weight of the adhesive. Optimum concentrations for most purposes range from about 11 to 15%. In contrast when a soya flour is employed as source of protein it is impossible to produce adhesives containing more than about 7–8% protein (12–16% soya flour) owing to the fact that higher proportions produce such high viscosities that the adhesives cannot be used practically. Higher proportions of denatured proteins can be employed in the making of silicate-protein adhesives but these adhesives are even inferior to those produced with soya flour.

My adhesives can be made from sodium silicates having a wide ratio of $Na_2O$ to $SiO_2$, varying from about 1:1.5 to 1:4.0. Metasilicates are too alkaline and act more like caustic soda in rapidly developing a putrid odor, although they can be used in dry mixes in admixture with dry silicates containing larger proportions of $SiO_2$. The optimum range of $Na_2O$ to $SiO_2$ is from about 1:2.4 to 1:4.0. These silicates are available as liquids and as hydrated soluble powders. For general use I prefer "N" silicate of soda which has a ratio of 1 $Na_2O$ to 3.22 $SiO_2$ and contains about 8.9% of $Na_2O$ or "O" silicate having the same silicate ratio but containing about 9.16% $Na_2O$.

The addition of clay to the adhesives is useful in some instances, particularly for making solid fiber board and tube winding formulations which require a high viscosity corresponding to 5–25 poises as an optimum range, whereas for corrugating adhesives, 1–2 poises is usually preferred. The "KCS" and "Hydrite" types of clay available from Georgia Kaolin Company have been found particularly successful in can winding adhesives. "Hydrite" has somewhat less grit and only 1% moisture compared to 3% in the "KCS." The clays Imacco 400 and Imacco 6B sold by Industrial Minerals and Chemicals Co., Berkeley, Calif. as well as ASP 400 sold by Minerals & Chemicals Corp. of America, Edgar Division are also useful. These clays can be added to my adhesives in proportions ranging from about 2 to 35% by weight.

It has also been found that for some purposes the addition of raw starch to the new adhesive is useful in proportions ranging up to about 10% by weight. The starch is helpful in improving the consistency and working character of the adhesive and in developing a good dry bond under poor machine conditions. It also permits in difficult cases the formulation of a more economical adhesive which maintains essentially the advantages of my invention.

For economy reasons it is also posible to incorporate soya flour into my adhesive in proportions up to about 10% by weight. This is helpful in formulations for making wound paper tubes, for example, where high viscosities are required. Among the soya bean flours which are satisfactory for use in this invention there may be mentioned the "IR 300" flour of the Staley Company, "Prosein" from the Gliddin Company, "Kaysoy" from Archer-Daniels-Midland Company and "Soysize" from Spencer-Kellogg Company, etc. In general the proportion of undenatured and unhydrolyzed isolated protein in such formulations should at least equal the starch and/or the soya flour content of the adhesives in order that they shall retain the characteristic and advantageous properties of my new adhesive.

Other additives can be incorporated in my adhesive. For example preservatives, such as sodium sulfite can be added to control viscosity and pot life as is customary in adhesives based on free alkali formulas. In some cases additives which merely increase the viscosity of the adhesives are advantageous. I have used with success for this purpose "Kelgin" and "Kelsize" which are alginates, sold by The Kelco Company, "Ketac," a resin condensate sold by American Cyanamid Co. as well as carboxymethylcellulose, dextrin and polysaccharides. 0.1 to three percent of these additives are usually sufficient. Sugar (sucrose), up to about 5% by weight, is an advantageous addition to some formulations, such as those used for uniting metal foil to paper, for example.

In preparing my adhesives it is necessary thoroughly to disperse the protein in water prior to the addition of silicate; otherwise lumps are sure to form. If desired, any clay to be incorporated in the adhesive can be mixed with the soya flour before the latter is added to the water. In order to speed up the mixing procedure it may also be advantageous to pre-mix the soya flour with a preserving-dispersing agent, such as pine oil or sulfonated castor oil. Anti-foaming agents can be added if needed.

A series of comparative tests were conducted to show the differences between the present adhesives and those prepared from soya bean flour as the source of protein. An attempt was first made to compound an adhesive from soya flour containing a quantity of vegetable protein equal to that employed in the best adhesives of the present invention, that is, one containing at least about 10% of protein. But it was found impossible to produce such an adhesive owing to the extremely high viscosity of the mixture. It was found necessary to reduce the protein content of the mixtures to 7% in order to obtain a comparison of bond strengths. Two different soya flour products were used and the adhesives prepared therewith were compared as to strength of bond produced with two of the present adhesives. Adhesive A contained 12.2% Prosein SF (7% protein), 9% "N" silicate and 77.5% water. Adhesive B contained 13.1% Staley IR 300 (7% protein), 9% "N" silicate and 72.8% water. Adhesive C contained 7% Buckeye protein (6% protein by analysis) 9% "N" silicate and 83% water. Adhesive D contained 7% Buckeye protein (6% by analysis), 9% "N" silicate, 4% raw starch and 79% water. The results obtained in this comparison are shown in the following table; the bond strengths given being based on a glue line having a length of 9.75 inches.

| Adhesive | Percent Protein | Bond Strength | | | |
|---|---|---|---|---|---|
| | | Hot Set | | Cold Set | |
| | | Dry, # | Wet, # | Dry, # | Wet, # |
| A | 7 | 39 | 5 | 12 | 0 |
| B | 7 | 33 | 5 | 10 | 0 |
| C | 6 | 30 | 4.5 | 25 | 2 |
| D | 6 | 31 | 4.25 | 19.1 | 1.0 |

It will be noted from the above table that neither of the soya flours produced cold set bonds having wet strength, whereas the two compositions made with Buckeye protein produced cold-set bonds having appreciable wet strength. This comparison is not quite fair to the adhesives of the present invention owing to the fact that these adhesives preferably contain substantially more than 6% protein; hence a fifth adhesive was made containing 8.5% protein (10% Buckeye protein), 13% "N" silicate and 77.6% water. This adhesive produced hot-set bonds having a strength of 60# dry and 10.5# wet and cold-set bonds having a strength of 38# dry and 3.5# wet. It is impossible to obtain bonds of comparable strength using soya flour owing to the fact that a silicate-soya adhesive containing 8.5% protein would be inoperative owing to its extreme viscosity. My tests indicate that no vegetable seed flours are capable of making silicate-protein adhesives producing cold-set bonds having wet strength.

The results obtained with adhesive D show that starch can be added to the present adhesives without substantially impairing the strength of their cold set bonds. The most striking fact that can be deduced from the above table is that my adhesives produce cold-set bonds (dry) having over twice the strength of similar bonds produced with soya flour while my adhesives produce cold-set bonds having appreciable wet strength as compared to the zero wet strength produced by cold-set bonds of soya flour adhesives. In other words my new adhesives produce cold-set bonds having novel properties and of a new order of strength, either wet or dry.

The new adhesives used in the above tests also had an operating life several times longer than those made with soya flour. For example after 21 hours the viscosity of adhesive B had risen to 123 Stormer seconds—too high to be used—while the viscosity of adhesive C had risen only from 8.2 to 10 Stormer seconds.

The bond strengths listed in the above table were obtained by a standard test procedure in which sections are cut from single face corrugated board having dimensions of 3" x 3⅛" with 13 flute tips exposed across the face of the single face board samples. Sections are also cut from liner board with dimensions of 3" x 3¼". A film of the adhesive to be tested is applied to a glass plate in a thickness of 0.01". The single face board is then placed flute tips down on the glue film so that the film will be picked up on the flute tips. The board should not slip or slide on the glue. Contact is made for a period of less than 3 seconds. The glue-coated face of the corrugated board is then applied to the face of the liner board and pressed against it with a block weighing 1282 g. for 5 minutes to produce a cold set bond. To produce a hot set bond the procedure is the same except that the combination is heated on a hot plate for 20 seconds at 320° F. while the 1282 g. weight is resting on it. After the bond has been produced the combined board is allowed to cure at room temperature for from 16 to 24 hours before testing. Test sections having dimensions of ¾" x 13 flute tips long are cut from the center sections of the bonded samples, the cuts being clean and sharp. Sections for the wet bond test are then completely immersed in 20° C. water for 24 hours, removed and tested while wet. Bond strengths are measured on a split jaw tester where steel teeth fit in the openings of the test sections. Force applied to one jaw puts the glue bond under increasing tension until rupture takes place. Bond strength is expressed in pounds required to rupture a glue line 13 flute tips long by ¾" wide, making 9¾" of glue line. When fiber tear is measured an estimate is made of the percentage of the ruptured area which retains fiber derived from the opposite ply, i.e. where the bond has proved to be stronger than the fiber of the ply.

*Example 1*

This example is a report of a plant test on a corrugating machine which was operated at different speeds in order to demonstrate that bonds of higher strength are produced at the higher speeds. The adhesive employed was made as follows: 70 parts of water were placed in a mixing container and then 13 parts of Buckeye protein were added and stirred in until fully wetted out and well dispersed. Not until a good dispersion had been accomplished were 17 parts of "N" silicate added and mixed in with an agitator until the adhesive became smooth and, in this case, developed a golden tan color. An adhesive made in this manner can be used immediately after preparation for making corrugated board but it becomes more homogeneous if allowed to stand for from about 30 minutes to 2 hours after it is made. Its operating life is at least 24 hours. Its viscosity gradually increases over this period but does not reach a viscosity too high for satisfactory machine use. Even after 7 days bonds can be made showing satisfactory water resistance although having a somewhat lower strength. This shows that the silicate does not cause degradation of the protein which is also shown by the fact that the adhesive develops no objectionable odor during storage, at temperatures below 75° F., for a week, nor is an odor of ammonia present, which would indicate hydrolysis of the protein. In contrast a silicate-protein adhesive made with soya flour instead of Buckeye protein would have an operating life of only a few hours.

The results of the corrugating tests with this adhesive, in which the platens of the machine were heated to about 350° F. are collected in the following table:

| Machine Speed f.p.m. | Average Bond Strength in Pounds for a 9.75" Glue Line After 24 Hours' Soaking | |
| --- | --- | --- |
| | Single Face | Double Back |
| 240 | 4.9 | 5.3. |
| 300 | 4.9 | 6.2. |
| 350 | 6.0 | 6.3. |
| 450 | 7.3 (49% increase) | 6.8 (28% increase). |

The same adhesive was employed in another test on the same corrugating machine but without application of heat. It was found that the board required a definite curing period of at least 24 hours for the bonds to set. Some of the board so produced was cured for 10 weeks and it was found that the wet bond strength of the double backer bonds ranged from 2½ to 4 pounds. A wet bond strength of this magnitude is adequate for most purposes.

*Example 2*

In this example a series of silicate-protein adhesives were made up to compare the hot-bond strengths and percent tear extensions produced by different types of isolated proteins. All of these contained 13% protein, 17% "N" silicate and 70% water. The results are reported in the following table in which the first figure in each column (before the hyphen) represents the bond strength in pounds per 12" of glue line, while the figures following the hyphen are the tear extensions expressed in percentage of the total area:

| Protein | Bond strengths | | |
| --- | --- | --- | --- |
| | Dry | Wet | Redried |
| Buckeye | 52-40 | 5.8-80 | 53-10 |
| Alpha | 41-0 | 0.3-0 | 12-0 |
| Beta | 61-30 | 6.4-90 | 59-20 |
| Drackett 112A | 44-1 | 0.3-0 | 14-0 |

The Alpha and Drackett 112A proteins are proteins which have been denatured and/or hydrolyzed during isolation, while the Buckeye and Beta proteins are undenatured and unhydrolyzed and hence are useful in the present invention. It is evident from the results reported in the table that the undenatured proteins produce hot-set bonds of substantially higher strength and substantial tear extensions even in the case of wet and redried bonds whereas, in contrast, the denatured proteins produce negligible or generally zero tear extension. Cold-set bonds produced by the above denatured protein adhesives would exhibit zero wet strength. The wet bond strengths in the above table were determined after soaking for 24 hours at 73° F., while the redried bonds were measured for strength after drying for four days at 73° F. and 50% relative humidity.

The adhesives were made up by first dispersing the protein in water, then adding silicate and rotating the mixture in a ball mill for an hour to assure uniformity. The adherents were B-flute single faced board with a Chemfibre medium and a 70 pound 20 pt. kraft liner. The bonding procedure was the same as that described previously except that the test specimens measured one-half inch in width and were sufficiently long to include 12 double backer flute tips. The board was set by placing it on a hot plate operating at a temperature of 350° F. with a 1975 g. weight on top for a period of 15 seconds.

*Example 3*

In this example a series of silicate-protein adhesives was tested each containing 13% Buckeye protein mixed with silicates of varying silicate ratio but all containing the same amount of $Na_2O$, water making up the rest of the mixtures. Cold-set bonds were produced with these adhesives and the strengths of these bonds both wet and dry are reported in the following table:

| Ratio, $Na_2O:SiO_2$ | Composition, Percent Silicate | Percent Water | Cold-Set Bonds | |
| --- | --- | --- | --- | --- |
| | | | Dry, # | Wet, # |
| 1:1 | 1.5 | 85.5 | 25 | 3.5 |
| 1:1.8 | 12.1 | 74.9 | 40.6 | 4.5 |
| 1:2.38 | 11.4 | 75.6 | 40 | 6.4 |
| 1:2.58 | 12.7 | 74.6 | 39.7 | 7.4 |
| 1:3.22 | 20 | 67 | 36.2 | 6.1 |

The adhesive made up with the metasilicate (1:1 ratio) was somewhat too alkaline since the alkali present caused degradation of the protein. The adhesive made up with the 1:1.8 ratio silicate was also so alkaline that the protein was degraded rather rapidly but the adhesive could be used for some purposes. While 1:3.22 is the highest silicate ratio shown in the above table I have prepared cold-set combined board with a silicate of ratio 1:3.75 containing 13% Buckeye protein, this board giving satisfactory bonds both when dry and when wet.

*Example 4*

In this example a series of silicate-protein adhesives were prepared with widely different silicate content. All were prepared using "N" silicate of ratio 1:3.22. Combined boards were prepared and the strength of the hot-set bonds were measured, the results obtained being tabulated in the following table:

| Buckeye Protein, Percent | N Silicate, Percent | Dry Bond, p.s.i. | Wet Bond, p.s.i. |
|---|---|---|---|
| 13 | 10 | 45.8 | 7.2 |
| 13 | 20 | 47.4 | 6.5 |
| 13 | 47 | 37 | 2.5 |
| 5 | 55 | 16.7 | 1.9 |
| 11 | 11 | 40 | 11 |
| 16 | 22 | 25 | 7.6 |

It is evident from these results that my silicate-protein adhesives can be prepared containing widely different percentages of silicate.

Example 5

In the manufacture of solid fiber board highly viscous adhesives are employed. I prepared one containing 16% Buckeye protein, 22% "N" silicate and 62% water. The viscosity of this increased from about 10 to 780 Stormer seconds in 24 hours but was still satisfactory for this use. Another containing 20 parts Buckeye protein, 25 parts "N" silicate and 55 parts of water was found to produce good water-resistant bonds between layers of chip board used in the production of solid fiber.

Additions of clay reduce the cost of these adhesives. For example a suitable low-cost adhesive can be produced containing 8.4% Buckeye protein, 11.1 parts of "N" silicate, 33.3% of KCS clay, 0.1% sodium sulfite and 47.1% water. With increase of clay content bond strength decreases. The clay content can be varied from about 2.5% to 35% and any of the well known clays can be used, such as ASP 400, Suprex, Huber's Paragon and Imacco B6. Diatomaceous earth can be used as an equivalent.

Example 6

A series of plant tests were run at a plant which had been using a conventional starch-urea-formaldehyde (SUF) adhesive for making water resistant corrugated board. This adhesive was very objectionable to the workers since it developed a strong noxious odor and it could be used only at relatively low speeds of 100 to 180 feet per minute. In the first test an adhesive was used containing 13% Buckeye protein, 17% "N" silicate and 0.15% Kelsize (to regulate the viscosity) and the rest water. A highly sized board was made with heated platens at the rate of 300 f.p.m. 198,000 feet were produced. When the speed was increased to 450 f.p.m. loose edges appeared over short intervals but these were found to set up overnight in the pile—an important advantage of my new adhesives. The machine helpers were much pleased at the absence of odor with this new adhesive. The adhesive spread was 1.6 gallons per 1000 square feet. In another test an adhesive was used with the same percentages of protein and silicate but containing 2% clay instead of Kelsize. The viscosity of this adhesive was lower and the spread obtained was only 1.16 gallons per 1000 square feet. The machine was operated at speeds ranging from 300 to 350 f.p.m. Owing to the lower spread the bonds were somewhat weaker but some of this board was soaked for 10 days without ply separation.

In another test an adhesive was employed containing 14.75% Buckeye protein and 15.65% "N" silicate. 45 pound 16 pt. Fourdrinier kraft liners were used. A very high speed was used. The board produced was tight on both sides up to speeds of 400 f.p.m. and it had a very good fiber tear even though the glue line was heavy and damp. The corrugating medium used in this run would not permit operation with the conventional SUF adhesive at speeds greater than 180 f.p.m.

In still another test soya flour was used to make up part of the protein content. The wet tear was decreased but the board showed somewhat less brittleness which appeared at times at the single face bond. The adhesive contained 9.6% of Buckeye protein, 15.7% "N" silicate and 5.9% of Staley IR 300 soya flour (containing 63% soluble protein). Duplex arch board was made at greater speeds than with the conventional SUF adhesive and with no obnoxious odors from the adhesive. In this case ½ wrap was used on the double backer and single face drums and ⅔ wrap on the preheater for the corrugating medium. 155 p.s.i. of steam were carried on the plate. During a short interval when the preheater went cold the edge became loose but this set up in the pile overnight. Speeds of up to 400 f.p.m. were used. The spread was about 2 gallons per 1000 square feet. There was less build-up on the fingers of the machine than with either a starch or a SUF adhesive and there were no difficulties with clean-up problems. A sample of this board produced at 340 f.p.m. was aged for a month and then tested for strength of bond. Single face dry bonds showed a strength of 43 pounds for 12" of glue line with 1% tear, while the wet bonds had a strength of 8.2 pounds with 30% tear. The double-backer had dry bond strengths of 51 pounds with 2% tear while wet bonds showed strengths of 7.5 pounds with 70% tear.

Another heat set plant test was run using high quality kraft stock with an adhesive composed of 9% Buckeye protein, 6% Soywhite soy flour, 3.5% starch, 19% "N" silicate of soda, and 62.5% water. Sample A board was produced at 100 f.p.m. and Sample B board at 200 f.p.m. The data in the following table show that the board run at the higher speed had the better bond. Samples were conditionioned at 73° F. and 50% R.H. and wet bonds were tested after 24 hours soaking. The strengths are given in lbs./12 in. flute tip and the fiber tear as percent extension.

| Board | SF Side | | | | DB Side | | | |
|---|---|---|---|---|---|---|---|---|
| | Dry | | Wet | | Dry | | Wet | |
| | Str. | Tear | Str. | Tear | Str. | Tear | Str. | Tear |
| A | 36 | 1 | 3.9 | 10 | 49 | 40 | 2.8 | 40 |
| B | 51 | 2 | 4.5 | 30 | 63 | 60 | 3.4 | 80 |

From the point of view of the plant operators, for hot set bonds, the great advantage of using the new adhesive is the absence of noxious odors and the remarkable increase in operating speed with a concurrent increase in bond strength as well as the setting up in the stack of any initially imperfect bonds.

During the above plant tests there was very good pan life and finger life. When using the SUF adhesive it was necessary to shut down the machine every 8 to 12 hours for pan and finger clean-up but my adhesive could be run over 24 hours without such shutdowns. There was no difficulty in cleaning the hot plates since large sections of baked glue flaked off cleanly. There was also no difficulty from warp. The board was uniformly flat and firm in contrast to the SUF board.

Example 7

The addition of from about 2 to 4% of sugar was found to improve bond strengths and fiber tear to a certain extent. It prevents loss of strength compared to a formula without sugar. Thus, a formula having the composition 10% Buckeye protein, 2% Prosein soy flour, 2% starch, 2% ordinary sugar, and 16% "N" silicate gave bond strengths at least equivalent to a formula made up of 10% Buckeye protein, 4% soy flour, 16% "O" silicate, and 70% water. Using the sugar formula, the bonds were moist at the cut-off, but both double-backer and single-face bonds had good dry fiber tear. Using this adhesive, it was possible to reduce the steam on the preconditioner and thus reduce the temperature of the medium.

Example 8

In another example using sugar in the adhesive aluminum foil was laminated to white paper using a formula with 10% Buckeye protein, 16% "O" silicate, 5% sugar, 4% Staley soy flour, and 70% water. The adhesive was brushed on the dull face of the aluminum foil and the paper placed on the coated foil. Some samples were set at 300° F. and others were set cold. A good dry bond was obtained with or without heat although with the hot set bond, more fiber tear was obtained. Also, the hot set bonds could be soaked in cold water for eight hours immediately after preparation whereas the cold set bonds needed a curing period. Both the cold and hot set bonds had high redry strength.

Example 9

In this example two of my new adhesives were compared with a conventional Dextrin adhesive in the making of solid fiberboard. Adhesive A contained 10.5% Buckeye protein, 29.8% of KCS clay from the Georgia Kaolin Company, 12.3% of "O" silicate and 47.4% of water. Adhesive B was similar in composition except that Barden clay from J. M. Huber Company was substituted for the KCS clay. In making these adhesives the protein was first mixed with the water, the clay was then added and finally the silicate. The mixture formed a soft thick paste—like whipped cream—which could be spread easily as a film. The dextrin adhesive was one sold for laminating purposes.

Stirps of kraft paper were coated by hand with the adhesive to be tested and then similar sheets were pressed down on top and held with kilogram weights at spaced points. After applying the weights for about 300 seconds they were removed and the bonds were then allowed to cure for 48 hours before being measured for strength and fiber tear. The results of these tests are presented in the following table:

CURED STRENGTH (LBS.) AND FIBER TEAR (PERCENT)

| Adhesive | Dry, percent | Soaked, percent |
|---|---|---|
| Mix A | 9.9-100 | 0.2-0 |
| Mix B | 9.7-100 | 0.2-1 |
| Dextrin | 8.0-100 | 0.0-0 |

The above results show that my adhesives produce cold-set cured bonds having a dry strength considerably higher than that of the bonds produced by dextrin and that my bonds show a definite wet strength whereas dextrin produces bonds having zero wet strength. A longer curing period would have produced bonds with higher wet strengths. In laminating tests with my adhesives it was found that solid fiberboard can be made at rates up to 500 f.p.m. in the cold with no warping.

Example 10

In this example two 78 pound water-finish sheets of paper were laminated at a speed of 115 f.p.m. With conventional adhesives the steam pressure used on the steam roll for this operation would be from 20 to 75 p.s.i. but with one of my adhesives it was found possible to reduce the steam pressure to 5 p.s.i.

This adhesive contained 10.2% Buckeye protein, 12.0% "O" silicate, 34.2% Paragon clay, 0.1% sodium sulfite and 43.5% water. The spread was about 2 to 3 pounds dry solids per 1000 square feet. The adhesive was applied to the smooth side of the water-finish sheet and there was about 4 to 6 feet of air exposure before the adhesive film was contacted with the rough side of the second sheet forming the laminated board. The combined sheets were pressed together in a set of nip rolls; they then traveled 10 feet to another set of nip rolls and then to the drier rolls.

The laminated paper was then rewound and shipped. Using 42 pound paper with the same set-up a laminating speed of 190 f.p.m. was used. In all cases satisfactory bonds were produced.

Example 11

In this example several of my adhesives were used in the winding in the cold of 12 inch diameter drums having 10 plies with 9 glue lines at speeds of about 480 f.p.m. The starch-urea-formaldehyde adhesive usually used in this operation could be run only at 200 f.p.m.

The first adhesive used contained 12% Buckeye protein, 24% KCS clay, 12% of "O" silicate, 0.1% sodium sulfite and 51.9% water. A small amount of sodium tripolyphosphate was also added to sequester the calcium hardness in the water employed in making the adhesive. The adhesive was made by first adding the polyphosphate and clay to the water, letting the mixture stand for 30 minutes, then adding the silicate and sulfite and finally the Buckeye protein. The viscosity was too high to be measured with a Marsh funnel but it formed drums with a satisfactory waterproof bond at high speed. After curing for 48 hours the tubes passed the JANP108 delamination test and the wet Beach puncture test. The bonds were esoaked for four days without ply separation.

In a similar test satisfactory tubes were made with an adhesive containing 75% "O" silicate and 25% Beta protein from The Glidden Company. Sodium dimethyl dithiocarbamate was added as a preservative.

Example 12

In this example 8-ply kraft paper drums were wound in the cold using an adhesive containing 10% Buckeye protein, 12% "O" silicate, 29% Huber's Paragon clay, 0.1% sodium sulfite and 48.9% water. Dry fiber tear was excellent and soaking in water produced no delamination. The outside flap was tight with no "dog ears." Set was rapid with a drum cycle time on the machine of about 10 seconds using 5 seconds for bonding and 5 seconds to set the outside flap and remove the tube from the mandril. The dry caliper ranged from 122 to 128 thousandths of an inch and the wet caliper showed an increase of 68%, i.e. to 205–215. The weight in grams for a 25" specimen was 38.8 g. dry and 98.2 g. wet or an increase of 153%.

Laboratory tests indicate that for solid fiber drums one of the best adhesive formulas is 12% Buckeye protein, 10% "N" silicate, 20% KCS clay and 58% water.

Example 13

Two formulas were used to laminate paper to wood. The first contained 11% Buckeye protein, 13% "O" silicate, 28% ASP 400 clay and 48% water. The second contained 12% Buckeye protein, 14% "O" silicate, 26% ASP 400 clay and 48% water. In both cases good fiber tear was obtained with dry bonds, wet bonds and redried bonds, although the second mix gave somewhat better fiber tear. In the first laminating operation the oil temperature used to heat the laminate was 350° F. and in the second case about 260° F. The dry bond improved with 15–20 minutes of curing after the board was laminated but this curing was not required since the bonds were satisfactory for immediate cutting.

The above adhesives were somewhat heavy for use on the machine, so a thinner mix was made containing 13% Buckeye protein, 16% "O" silicate, 23% ASP 400 clay and 48% water with the addition of 0.1% sodium sulfite. Using this adhesive satisfactory board was made both with cold and hot-set bonds.

Example 14

In this example my adhesive was used as a so-called parting coating. The adhesive contained 15% Buckeye protein, 20% "O" silicate and 70% water. This was applied as a thin coating on paper and then a layer of 350° F. asphalt was applied over the coating. This asphalt layer could be readily stripped from the paper i.e. good parting was obtained.

*Example 15*

It is obvious, of course, that my adhesives can be prepared and sold in the form of dry mixes which need only to be dispersed in water for adhesive use. In the present example I prepared three typical dry mixes using as the silicate "GD" silicate which is a dry, free-flowing solid containing 27.5% of $Na_2O$ and 55.0% of $SiO_2$. Adhesive dry-mix #1 contained 0.7 part of this "GD" silicate and 13 parts Buckeye protein. To make an adhesive from this I took 13.7 parts of the dry mix and dispersed it in 86.3 parts water by rotating the mixture in a ball mill for an hour. Dry-mix #2 contained 13 parts Buckeye protein, 2 parts Celite diatomaceous earth and 1 part of "GD" silicate. The liquid adhesive was made by dispersing 16 parts of the dry-mix in 84 parts of water in the ball mill. Dry-mix #3 contained 8 parts of Buckeye protein, 8 parts of #7121 pearl corn starch from Anheuser-Busch Co., 0.15 part of Kelsize and 1 part of "GD" silicate. 17.2 parts of this dry-mix were dispersed in 82.8 parts of water to produce a liquid adhesive. Laminated bonds made with these three adhesives were tested by the method outlined in Example 2 with the following results:

| Adhesive | Bond Strength And Percent Tear Extension | | |
|---|---|---|---|
| | Dry Bonds | Wet Bonds | Redried Bonds |
| 1 | 46-2 | 5.2-60 | 47-1 |
| 2 | 48-2 | 5.2-70 | 48-5 |
| 3 | 63-10 | 5.3-1 | 56-5 |

These adhesives were also found to produce cold-set bonds having substantial wet strength after curing for at least 24 hours.

While I have described in the foregoing what I consider to be my most advantageous adhesives and uses therefor it is obvious, of course, that various modifications can be made in these adhesives and their uses without departing from the purview of this invention. Thus while the principal uses for my adhesives comprise laminating corrugated paper board and solid paper board, as well as laminating paper to wood and metal foil to paper or wood, my adhesives can be used in a number of other ways. They are especially useful for applying thin paper to heavy board or to building board, wall board etc. even if asphalt treated. The adhesives can also be used as coatings to be applied to paper and paper board, as a fire and water-resistant paint for acoustic tile, as a substitute for animal glue on creping machines, for laminating wood to concrete and for laminating plywood. Owing to their relative low cost, as compared to conventional adhesives now used for making water-resistant corrugated boxes, these boxes can be made with my adhesives at a cost only slightly above that of standard boxes, whereas water-resistant boxes made at present with conventional adhesives cost from two to three times as much as standard boxes.

My dry-mix adhesives are resistant to rats and vermin and can be stored almost indefinitely in open warehouses. While soy beans represent the cheapest satisfactory source from which to isolate the undenatured and unhydrolyzed protein fractions which are useful in this invention, satisfactory protein fractions can be isolated from other protein-rich oil seed flours, such as cottonseed, peanuts, castor beans, tepary beans, Alaska peas etc., provided that the protein fraction is extracted from the flour by water at a pH not exceeding 8, followed by precipitation of the protein from the extract at the isoelectric point of the protein and recovery of the protein thus precipitated. This protein fraction is substantially free from carbohydrates, ligniferous matter, products of denaturation and hydrolysis and contains over 90% of high-molecular protein as calculated from its nitrogen content. Various disinfectants or antibiotic agents can be added to my adhesives to prevent the development of odors. I have used successfully for this purpose 1% of Dowicide G, based on the protein content of the adhesive. Dowicide A and Vancide are also useful for this purpose. As little as 0.01% of chloromycetin will also prevent development of odors. These should be added when the adhesives are made up. Other modifications of the present invention which fall within the scope of the following claims will be immediately evident to those skilled in this art.

Now having fully described my invention, what I claim is:

1. A novel adhesive comprising: (A) from about 5–25% by weight of a water-extracted isolated protein fraction derived from a protein-rich vegetable oil-seed flour, (a) said protein fraction containing over 90% protein as calculated from its nitrogen content (b) said protein fraction being free from carbohydrates, ligniferous matter, products of denaturation and products of hydrolysis (c) said protein fraction being free from compounds soluble in water at the isoelectric point of the protein (B) said protein fraction being dispersed in from about 5–75% of aqueous sodium silicate having a weight percent ratio of $Na_2O/SiO_2$ within the range from about 1:15 to 1:4 (C) sufficient water being present to produce operable viscosity at operating temperatures, said adhesive having the following novel combination of properties: (D) capable of setting in the cold to produce bonds having wet strength (E) being free from extraneous alkali other than that present in the sodium silicate (F) having a working life of from about one day to several weeks (G) having the characteristic property of forming a bond which has a wet strength and produces tear extension both when wet and when dry under both cold and hot setting conditions.

2. The product of claim 1 in which the protein fraction is one which has been isolated at temperatures not substantially exceeding about 95° C. by extracting soya flour with liquid water close to the neutral point and at a pH not above 8, followed by precipitating protein from the extract at the isoelectric point of the protein and recovering the so-precipitated protein fraction.

3. The adhesive of claim 1 wherein the composition includes up to about 10% of starch but not substantially more starch than protein fraction.

4. The adhesive of claim 1 wherein the composition contains up to about 10% of soya flour but not substantially more soya flour than protein fraction.

References Cited in the file of this patent

UNITED STATES PATENTS

| | | |
|---|---|---|
| 2,127,298 | Isaacs | Aug. 18, 1938 |
| 2,216,251 | Quisling | Oct. 1, 1940 |
| 2,284,700 | Wahlforss | June 2, 1942 |
| 2,331,619 | Morse | Oct. 12, 1943 |
| 2,392,302 | Baker et al. | Jan. 8, 1946 |
| 2,457,108 | Baker et al. | Dec. 28, 1948 |
| 2,484,878 | Eberl | Oct. 18, 1949 |
| 2,600,388 | Beckel et al. | June 17, 1952 |
| 2,681,290 | Baker et al. | June 15, 1954 |
| 2,788,305 | Sheeran | Apr. 9, 1957 |
| 2,810,657 | Preusser | Oct. 22, 1957 |

OTHER REFERENCES

"Hackh's Chemical Dictionary," Grant, 3rd Ed., 1944, pg. 454.

UNITED STATES PATENT OFFICE
CERTIFICATE OF CORRECTION

Patent No. 2,894,847                                          July 14, 1959

Roy E. Wright

It is hereby certified that error appears in the printed specification of the above numbered patent requiring correction and that the said Letters Patent should read as corrected below.

Column 1, line 49, for "papaer" read -- paper --; column 2, line 11, for "to expensive" read -- too expensive --; column 3, line 2, for "5.5." read -- 5.5.) --; column 6, line 6, for "unhoydrolyzed" read -- unhydrolyzed --; column 7, line 24, for "Gliddin" read -- Glidden --; column 10, line 33, for "adherents" read -- adherends --; column 13, line 24, for "12,3%" read -- 12.3% --; line 33, for "Stirps" read -- Strips --; column 16, line 29, for "1:15 to 1:4" read -- 1:1.5 to 1:4.0 --.

Signed and sealed this 19th day of January 1960.

(SEAL)
Attest:
KARL H. AXLINE
Attesting Officer

ROBERT C. WATSON
Commissioner of Patents